Jan. 13, 1959     C. R. THOMPSON     2,868,251
FREESTONE PITTER

Filed Dec. 22, 1954     6 Sheets-Sheet 1

INVENTOR
CLARENCE R. THOMPSON
BY Moore, Prangley & Clayton
ATTORNEYS

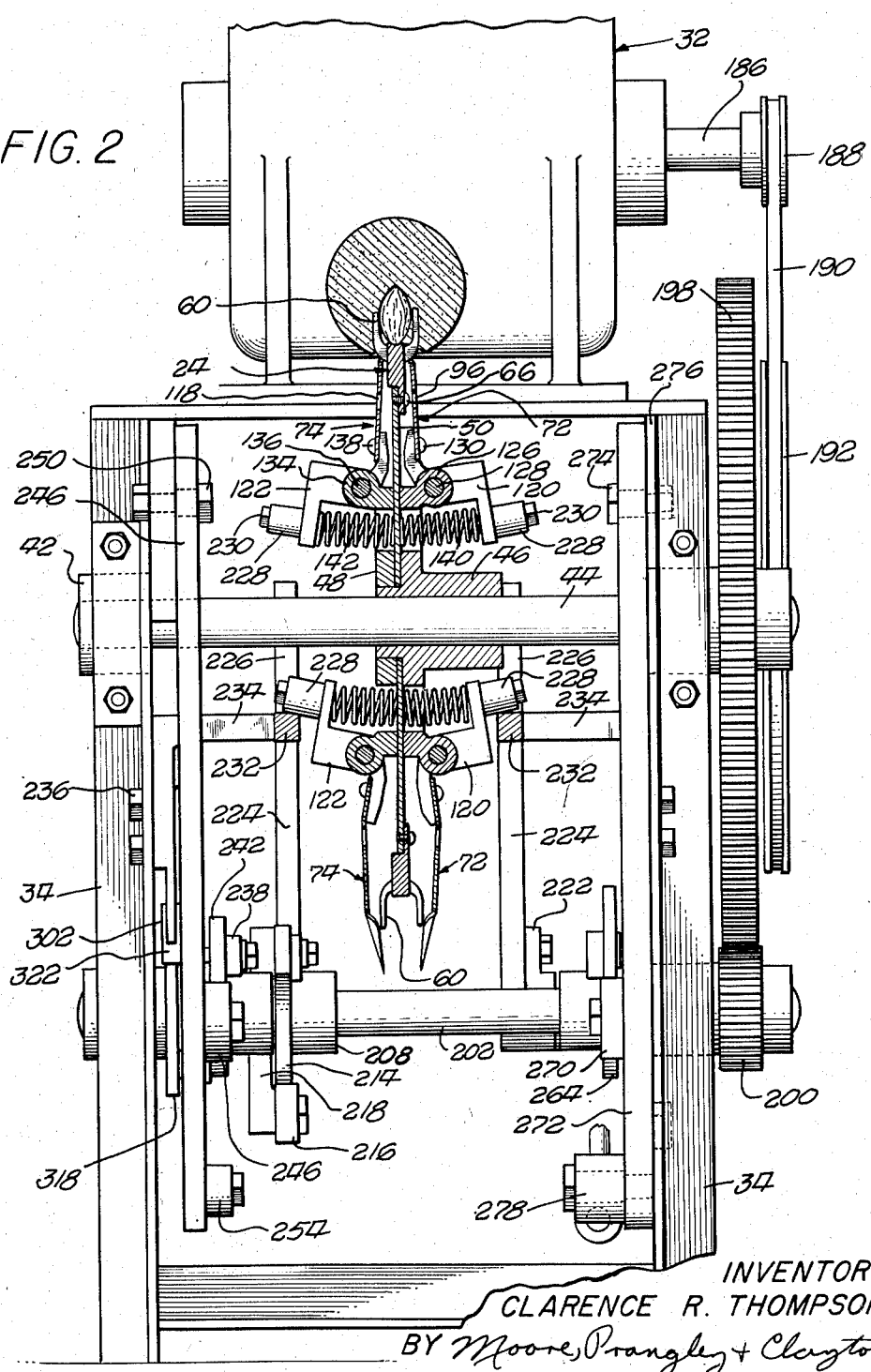

Jan. 13, 1959 C. R. THOMPSON 2,868,251
FREESTONE PITTER
Filed Dec. 22, 1954 6 Sheets-Sheet 3
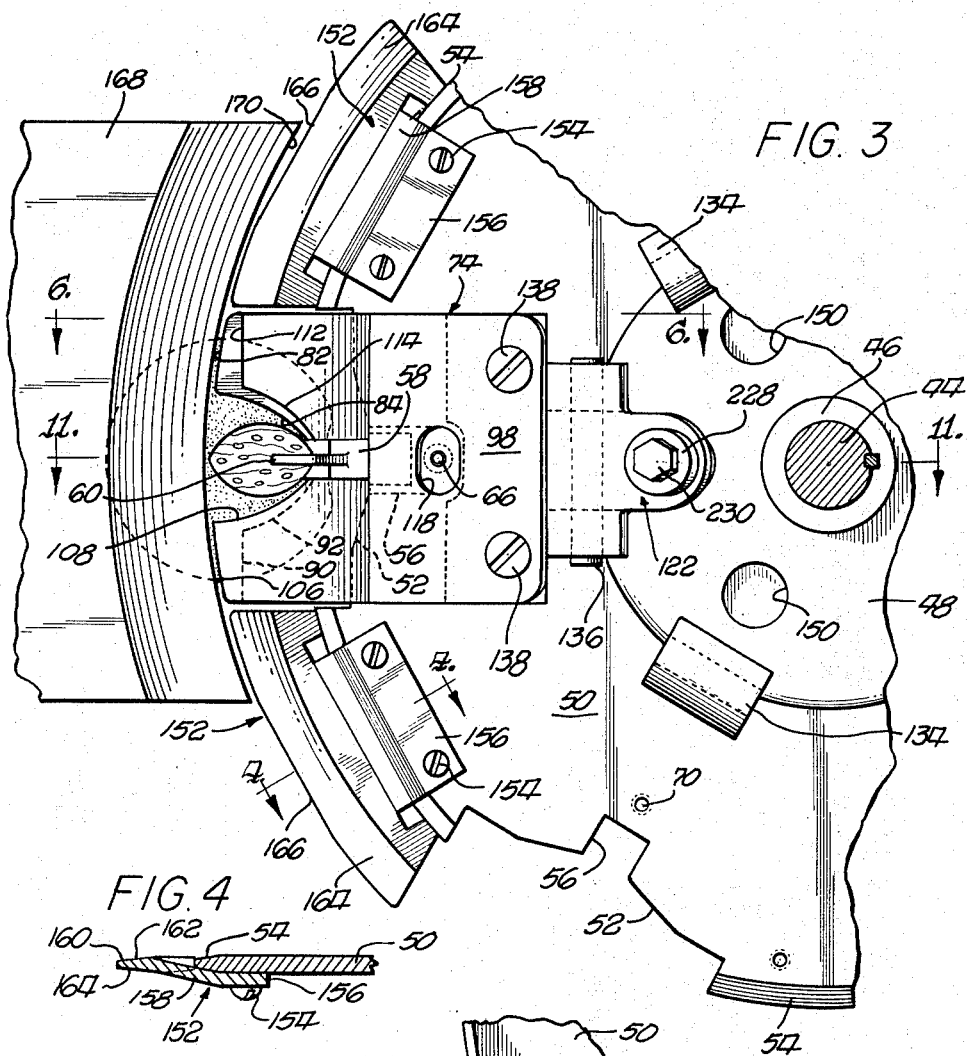
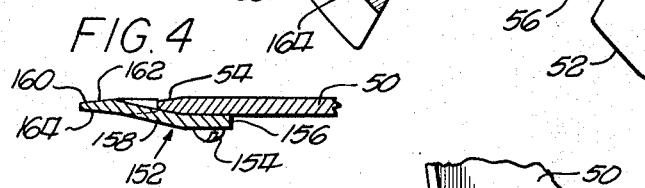
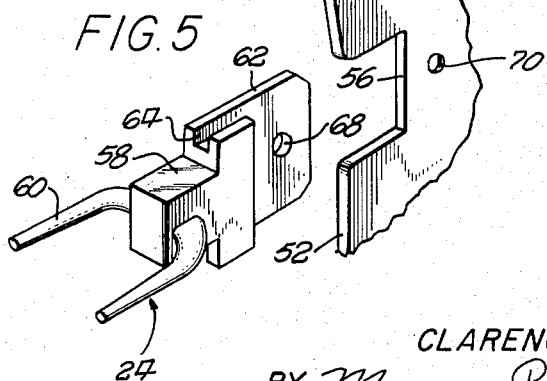
INVENTOR
CLARENCE R. THOMPSON
BY Moore, Prangley & Clayton
ATTORNEYS

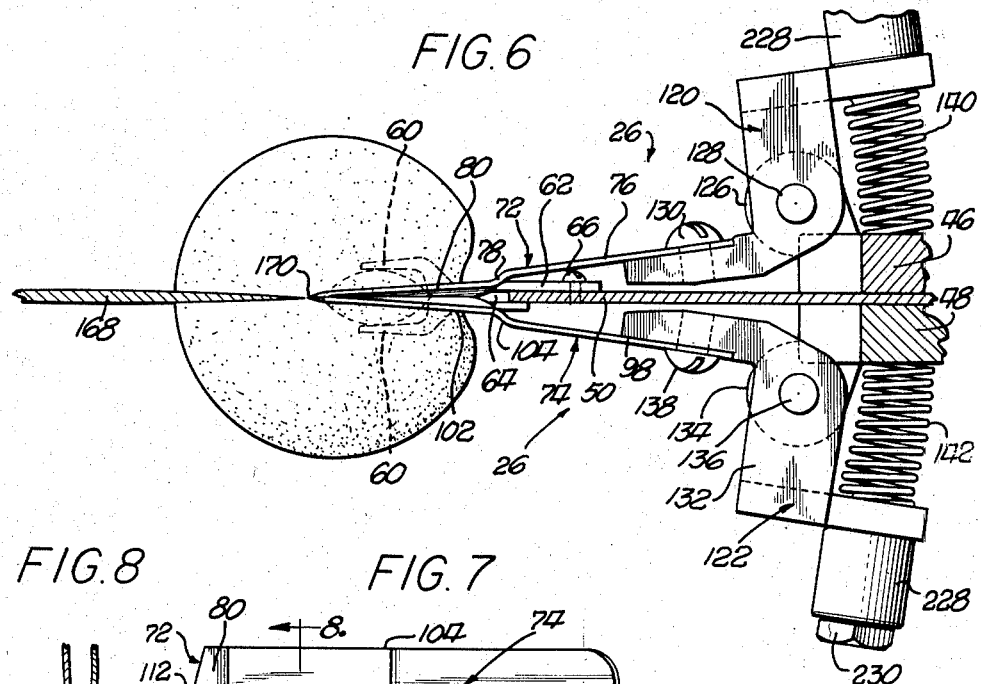
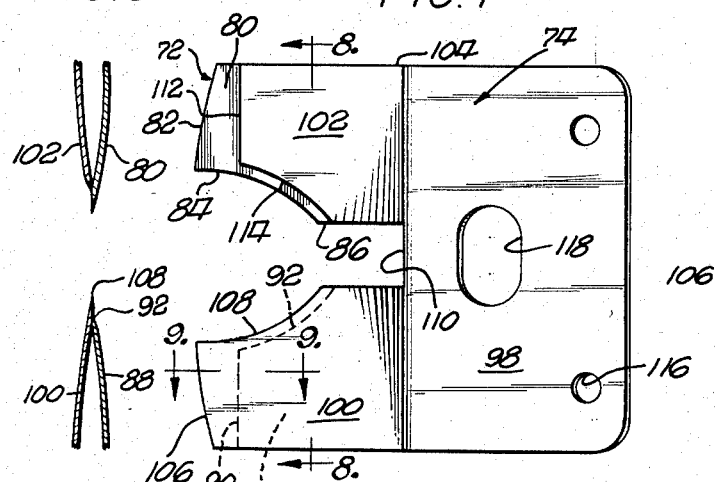
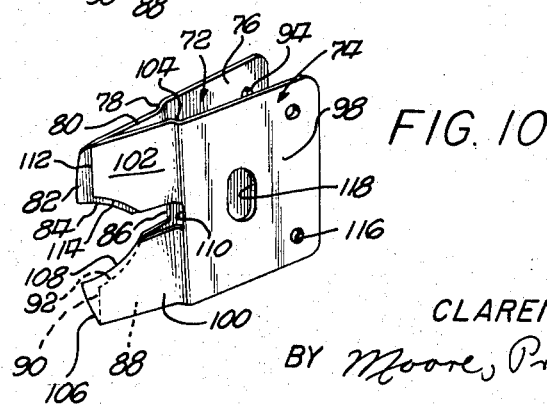

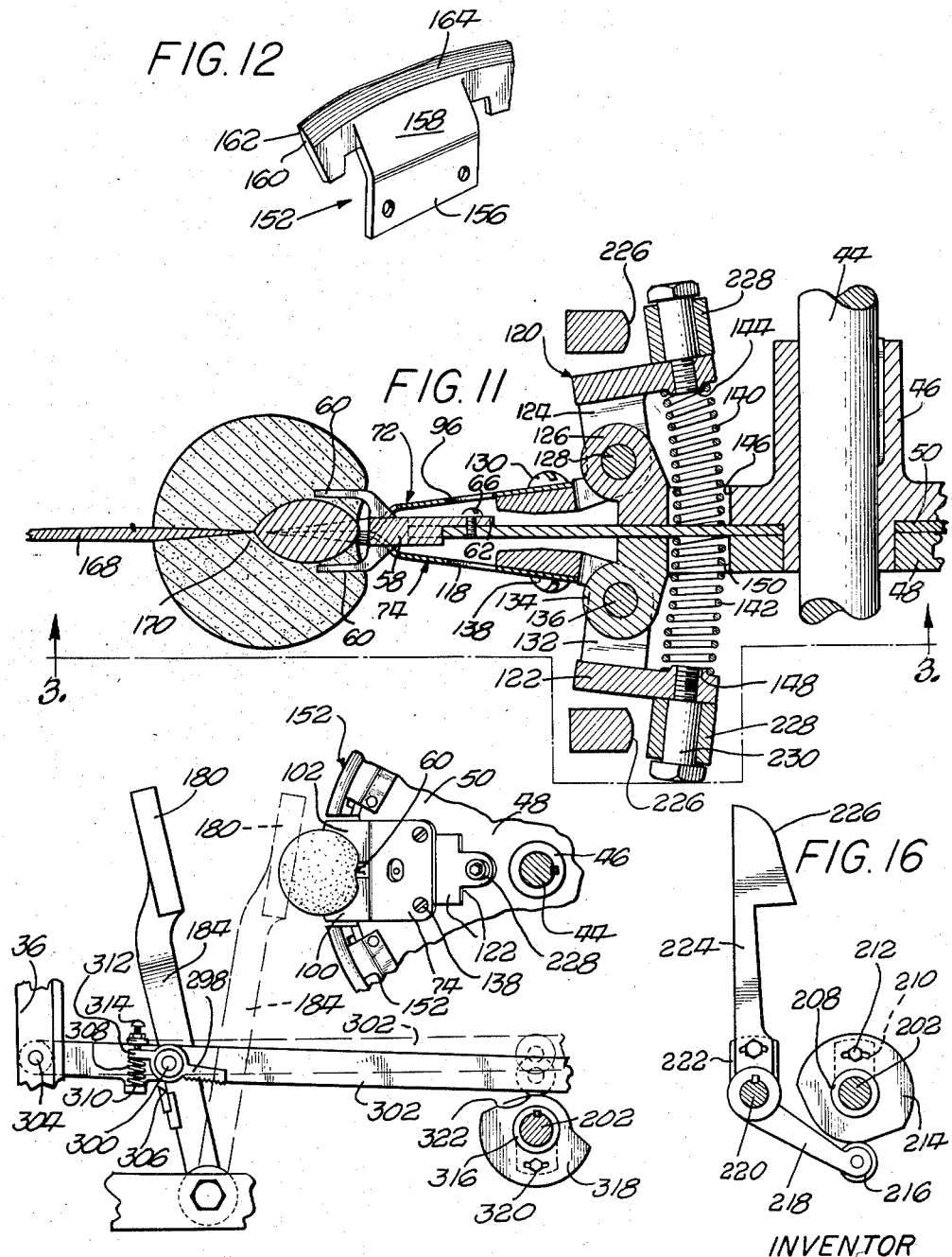

Jan. 13, 1959                    C. R. THOMPSON                    2,868,251
                                 FREESTONE PITTER
Filed Dec. 22, 1954                                          6 Sheets-Sheet 6

INVENTOR
CLARENCE R. THOMPSON
BY Moore, Prangley + Clayton
ATTORNEYS

United States Patent Office 2,868,251
Patented Jan. 13, 1959

2,868,251

FREESTONE PITTER

Clarence Richard Thompson, Olympia, Wash., assignor to Special Equipment Company, Portland, Oreg., a corporation of Oregon Application December 22, 1954, Serial No. 476,899

13 Claims. (Cl. 146—28)

This invention relates to machines for pitting freestone peaches and other fruit having the characteristics of easy separability of the fruit flesh from the pit possessed by freestone peaches, such for example as apricots and Italian prunes.

The improvements of this invention are incorporated in machines of the type wherein the fruit is impaled on a carrier or turret provided with fruit dividing means which scores or severs the fruit inwardly from one end or side thereof and partially around the pit as the fruit is placed on the carrier, the carrier conveying the impaled fruit to other fruit dividing means which scores or severs the flesh of the fruit inwardly from the opposite end or side of the fruit, one of the dividing means then operating to spread the divided fruit halves and discharge the fruit halves from the pit which is retained on the carrier for subsequent discharge therefrom.

In machines of the type set forth above, the fruit is impaled manually upon the carrier and this operation brings the hand of the operator into close proximity to the flesh severing and dividing apparatus of the machine. Safety to the hands of the operator is therefore a serious problem in machines of this type.

Accordingly, it is an important object of the present invention to provide an improved machine for pitting freestone peaches and the like of the type set forth; more particularly it is an important object of the invention to provide a machine of the type set forth which is more safe in operation and yet produces a superior product.

Another object of the invention is to provide an improved carrier or turret for machines of the type set forth which has no sharp edges formed thereon.

Yet another object of the invention is to provide an improved fruit spreader and dividing means which cuts one entire end or side of a peach and which after dividing of the other side of the peach, serves to spread the peach halves away from the pit.

Still another object of the invention is to provide an improved spreader and divider means or blade which will not bruise the end or edge of the fruit which is first impaled upon the carrier or turret.

In connection with the foregoing object, it is another object of the invention to provide a spreader and dividing blade which more readily and easily cuts the skin of a fruit impaled thereon and does not crush or bruise the cut face of the fruit in contact therewith.

A further object of the invention is to provide means on the carrier or turret in machines of the type set forth to guard the fingers of the operator from the cutting edges on the spreader and divider blades.

A still further object of the invention is to provide in machines of the type set forth an improved pit retaining device.

These and other objects and advantages of the invention will be better understood from the following description when taken in conjunction with the accompanying drawings. In the drawings wherein like reference numerals have been utilized to designate like parts throughout:

Figure 2 is an enlarged view partly in vertical section substantially as seen in the direction of the arrows along the line 2—2 of Figure 1;

Figure 3 is a fragmentary view on an enlarged scale showing the engagement of the second fruit severing blade with the fruit while the fruit is held by the first severing and dividing means, the view being substantially as seen in the direction of the arrows along the line 3—3 of Figure 11;

Figure 4 is a partial view in cross section through the carrier or turret of the present invention substantially as seen in the direction of the arrows along the line 4—4 of Figure 3;

Figure 5 is an exploded fragmentary perspective view illustrating the engagement of a pit retaining member with the carrier or turret;

Figure 6 is a partial view in horizontal section substantially as seen in the direction of the arrows along the line 6—6 of Figure 3;

Figure 7 is a side elevational view of a pair of spreader and divider blades utilized in the present invention;

Figure 8 is a view in vertical section through the blades of Figure 7 substantially as seen in the direction of the arrows along the line 8—8 of Figure 7;

Figure 9 is a view in horizontal section through the blades of Figure 7 substantially as seen in the direction of the arrows along the line 9—9 of Figure 7;

Figure 10 is a perspective view on a reduced scale of the blades shown in Figure 7;

Figure 11 is a view in horizontal section substantially as seen in the direction of the arrows along the line 11—11 of Figure 3;

Figure 12 is a perspective view of one of the guard members carried by the carrier or turret of the present invention;

Figure 15 is a fragmentary partial view on a reduced scale illustrating the latch mechanism for retaining the fruit presser of the present invention in urging relationship against a fruit positioned on the carrier; and Figure 16 is an elevational view illustrating the shape and mounting of the control cam for causing opening or spreading of the fruit spreading means.

The machine of the present invention is similar in construction and operation to and is an improvement upon the machine illustrated and described in the Patent 2,704,561, granted March 22, 1955, upon a co-pending application, Serial No. 182,773, filed September 1, 1950, for "Freestone Fruit Pitter."

Figure 1:
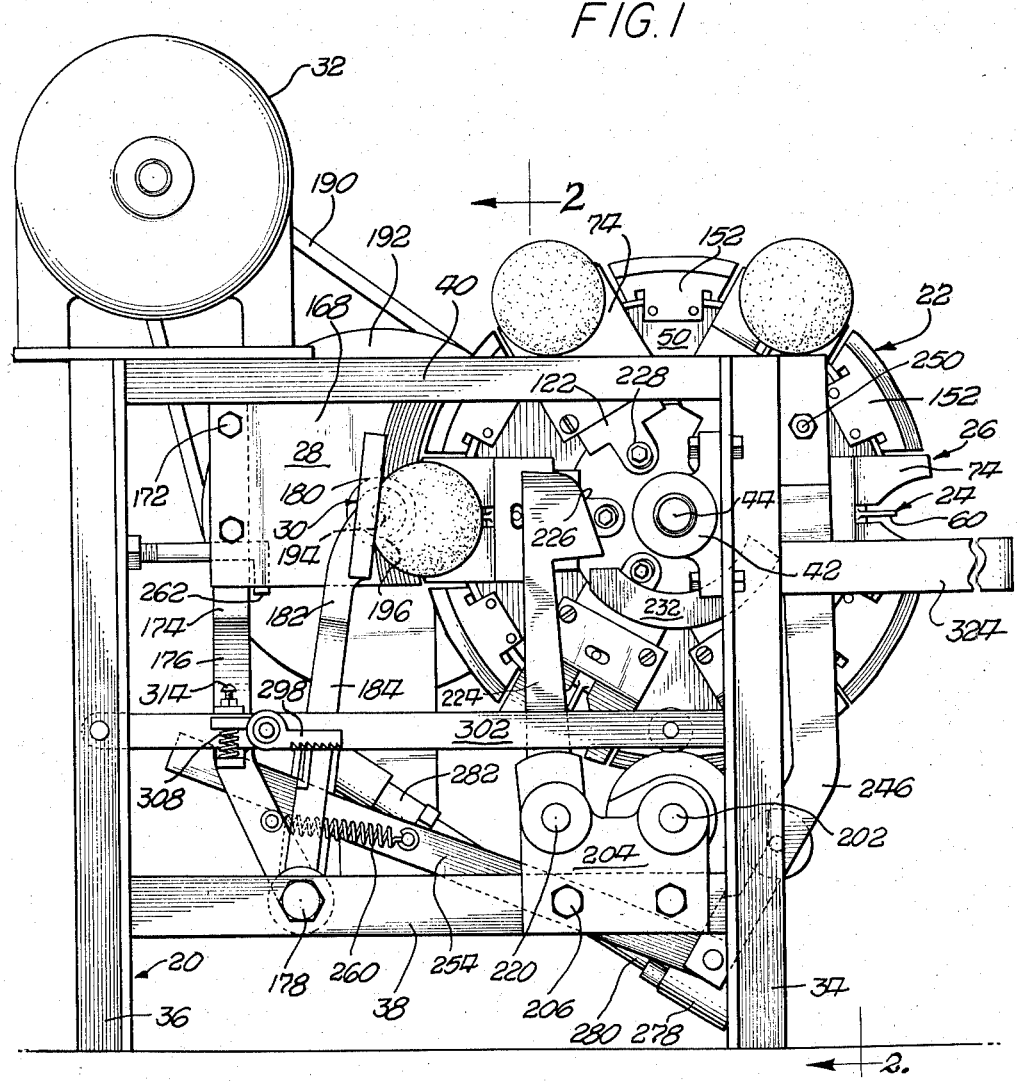
Figure 1 is a side view in elevation with certain parts broken away of a machine made in accordance with and embodying the principles of the present invention.

Referring now to Figure 1 of the drawings, a preferred embodiment of a machine made in accordance with the principles of the present invention comprises a frame 20 upon which is rotatably mounted a fruit carrier, conveyor, or turret 22 which in turn has mounted thereon a plurality of pit retaining devices 24 and a plurality of combined fruit flesh severing and spreading units 26. A second fruit severing member 28 is also provided and a fruit pressing or holding member 30. Motive power for the various operating portions of the machine is derived from a motor 32 mounted upon frame 20.

The frame 20 more particularly includes a pair of front angle iron legs 34 and a pair of rear angle iron legs 36 which are connected near their lower ends by a pair of lower side bars 38 and at their upper ends by a pair of upper side bars 40. The various legs and side bars are suitably interconnected as by bolts or welding. The carrier 22 is rotatably supported upon a pair of bearing members 42 which are bolted to forward legs 34 and receive a shaft 44 (see Figure 2 also). More specifically, a hub 46 is fixedly mounted upon shaft 44 and has attached thereto a disk 48. The carrier 22 includes a disk 50 which is fixedly received between hub 46 and disk 48.

Rotating plate or disk 50 is provided with a plurality of recesses or openings 52 on the periphery thereof, preferably six equidistantly spaced recesses 52 being provided around the periphery of disk 50. The edges of disk 50 between recesses 52 are bevelled as at 54 (see Figure 4 also).

The pit retaining devices 24 are mounted within substantially square notches 56 formed in disk 50 and communicating with recesses 52. Each pit retaining device 24 includes a body 58 from which extends forwardly a pair of pit prongs 60 (see Figure 5). Each prong 60 is elliptical in cross section at its junction with body 58 and tapers toward the free end which is circular in cross section and cut off square. The outer ends of prongs 60 are substantially parallel. Body 58 also has a rearwardly extending plate 62 attached thereon and a pair of grooves 64 in which the edges of notch 56 are adapted to be received. When the pit retaining member 24 has been assembled on the disk 50, a screw 66 (see Figure 6) or a similar suitable fastener is inserted through an aperture 68 in plate 62 and into a threaded aperture 70 in disk 50. It will be noted that the pit engaging member 24 including the body 58, the pit engaging prongs 60 and the plate 62 are formed integral. A preferred material of construction for the pit retaining means 24 is cast stainless steel. A notch 56 and a pit retaining member 24 is provided in each of the six equidistantly spaced recesses 52 about the periphery of disk 50.

A combined fruit severing and spreading means 26 is provided in each of the recesses 52, each including a pair of cutting and spreading blades 72 and 74, respectively. The construction of the blades 72 and 74 is best shown in Figures 6 through 10 of the drawings. Blade 72 includes a mounting portion 76 which has attached thereto by an offset portion 78 a first and longer cutting blade 80 which has a curved and sharpened forwardly directed edge 82. A second sharpened and concavely curved cutting edge 84 is formed on cutting blade 80 and terminates in a rearwardly extending U-shaped notch 86. A second forwardly extending offset cutting blade 88 is provided, cutting blade 88 being substantially shorter than cutting blade 80. The forward edge 90 of blade 88 is sharpened and a concavely curved cutting edge 92 is formed on blade 88 and runs from cutting edge 90 to the notch 86. The mounting portion 76 also has formed therein a pair of mounting apertures 94 and an elongated access aperture 96 (see Figure 2) which permits access to the screw 66 that holds the pit retaining member 24 in position. The combined fruit severing and spreader blade 74 is formed identical to blade 72 and includes a mounting portion 98 to which are attached cutting blades 100 and 102 by means of an offset portion 104. Blade 100 has a convexly curved forward cutting edge 106 which is sharpened. A concavely curved cutting edge 108 extends from the forward cutting edge 106 to a notch 110. Cutting blade 102 is formed with a straight forward and pointed edge 112 and with a concavely curved sharpened edge 114 extending from edge 112 to the recentangular notch 110. A pair of spaced apart apertures 116 provide means for mounting blade 74 and an elongated aperture 118 is provided which forms an access opening to reach the bolt attaching the pit retaining member 24 to disk 50 when necessary.

A bracket 120 is provided for mounting blade 72 and a similar bracket 122 is provided for mounting blade 74. Bracket 120 includes a pair of inwardly extending legs 124 (see Figure 11) which are apertured and are disposed in the assembled position on either side of a part-circular embossment 126 formed on the periphery of hub 46. Six embossments 126 are provided around the periphery of hub 46 whereby to accommodate six blades 72. A pin 128 serves pivotally to interconnect bracket 120 and the apertured embossment 126. A pair of screws 130 extend through apertures 94 in blade 72 and engage threaded apertures in bracket 120 thereby interconnecting blade 72 and bracket 124.

Bracket 122 includes a pair of inwardly extending legs 132 which are apertured and adapted to cooperate with an apertured part-circular embossment 134 formed on the periphery of disk 48. A pin 136 pivotally interconnects bracket 122 and embossment 134. A pair of bolts 138 extends through apertures 116 in blade 74 and bracket 122.

Bracket 120 and the attached blade 72 are maintained in the position shown in Figures 6 and 11 by a spring 140 and a similar spring 142 holds blade 74 in a cooperating position. One end of spring 140 is held in operative position by an embossment 144 formed on bracket 120 and the other end is received within an aperture 146 formed in hub 46. Spring 142 is similarly held in operative position by an embossment 148 formed on bracket 122 and by an aperture 150 formed in disk 48.

Each of springs 140 and 142 is normally under compression whereby to urge the rear ends of bracket 120 and 122 outwardly away from disk 50 thereby urging the forward sharpened ends of blades 72 and 74 together into touching relationship as illustrated in Figures 6 through 11. It will be seen that with the blades in this position the edge 112 on blade 74 is spaced considerably rearwardly from the sharpened cutting edge 82 and the forward edge 90 is similarly spaced behind the forward sharpened edge 106 on blade 74. This construction permits a single cutting edge to make an initial incision in the skin of the fruit as it is pushed upon the combined fruit severing and spreader blades 72 and 74, the blades 88 and 102 entering the fruit flesh only after the skin and flesh has been initially cut by the forward edges 82 and 106. This prevents bruising of the forward end of the fruit, i. e. the part of the fruit first presented toward the carrier 22, and the cut face of the fruit is likewise free from bruising because of the gentle insertion of blade portions 88 and 102. Similarly, edge 92 on blade 72 is spaced from the sharpened cutting edge 108 and edge 114 is similarly spaced from the sharpened cutting edge 84. Sharpened edges 84 and 108 serve to cut the flesh immediately adjacent the pit of the fruit and this construction likewise minimizes bruising and facilitates initial cutting of the skin and fruit flesh. The included angle between blades 80 and 102 and between blades 88 and 100 is small, i. e., about 5°, and the blades curve gradually away from the point of contact of edges 92 and 114 with blades 100 and 80, respectively, the included angles being about 10°. Both these features minimize bruising of the fruit.

Spreading of the fruit flesh from the pit is accomplished by pivoting brackets 120 and 122 in such a manner as to spread the ends of blades 72 and 74 away from each other while the fruit pit is held between the pit engaging prongs 60. The construction and operation of the mechanism to effect this spreading of blades 72 and 74 will be described more fully hereinafter.

The spaces between adjacent sets of severing and spreader blades 26 are filled with wings or guards or rim segments 152 which are suitably secured to the disk 50 by a pair of screws 154. Each guard 152 includes an attachment flange 156 which receives the screws 154 and has formed thereon an offset flange 158 which terminates in a substantially U-shaped guard portion 160. The outermost edges of guard portion 160 are bevelled as at 162 and 164 but the outermost edge is square or blunted whereby contact of this edge with the hand of an operator will not cause injury to the operator's hand. The general configuration of the outer edge of guard portion 160 is circular as may be best seen in Figures 1 and 3, the central portion being flattened as at 166 (see Figure 3 particularly). Guard portion 160 is positioned in line with disk 50 due to the offset flange 158 so that guard portion 160 forms, in essence, a continuation of disk 50. The outermost edge of guard portion 160 lies even with and forms a continuation of the sharpened outer ends 82 and 106 of the spreader blades 72 and 74, respectively. By providing the guard members 152, the fingers of an operator are guided away from the sharpened edges of the spreader blades 72 and 74.

The sharpened edges 82, 84, 106 and 108 on the spreader blades 72 and 74 serve to sever the skin of the fruit substantially half way around the circumference thereof and further cut the flesh down to the pit and for substantially the length of the pit. The remaining circumference of the skin and a portion of the flesh positioned between the pit and the blossom end of the fruit is cut by the second fruit flesh severing or scoring means 28 which includes a blade 168 having a bevelled and sharpened edge 170 (see Figures 3 and 11). The sharpened edge 170 of blade 168 is concavely curved and has a radius substantially equal to the radius of the cutting edges 82 and 106 on the spreader blades 72 and 74, respectively, so that blade 168 almost reaches and meets the cutting edges 82 and 106 on the spreader blades.

Blade 168 is periodically swung inwardly to sever a fruit positioned on disk 50 and to this end blade 168 is fastened as by bolts 172 to an arm 174 provided at the lower end with a pair of arms 176 which are pivoted to frame members 38 by bolts 178. This mounting permits blade 168 to be swung toward and away from disk 50, knife 168 scoring and severing the flesh of fruit positioned upon disk 50 when knife 168 is moved forwardly to the right as viewed in Figures 1 and 3.

The fruit retaining, pressing or holding means 30 comprises a pair of pressure pads 180, one pad being positioned on one side of knife 168 and the other pad being positioned on the other side of knife 168. Pads 180 are mounted upon arms 182 of a yoke 184 which is also pivoted on frame members 38 by bolts 178. The purpose of pads 180 is to press the fruit against the cutting edges on spreader blades 72 and 74 whereby to finish cutting and severing the flesh if the fruit has not been urged to the fullest seated position by the operator. The presser pads 180 also serve to hold the fruit against spreader blades 72 and 74 during the spreading operation when the flesh is being torn away from the pit.

Motive power for driving the various moving parts of the machine is provided by the motor 32 which preferably is an electric motor which is secured to the frame 20 in any suitable means such as by bolts. Motor 32 is provided with a suitable set of internal speed reducing gears and the output from the speed reducing gears appears at a shaft 186 (see Figure 2) which is provided with a pulley 188. A belt 190 engages pulley 188 and in turn drives a larger pulley 192 which is mounted upon a shaft 194 (see Figure 1) which also carries a small gear 196. Gear 196 meshes with a large gear 198 mounted upon and drivingly connected to shaft 44 which has been described above and upon which is mounted disk 50. Motor 32 through pulley 188, belt 190, pulley 192 and gears 196 and 198 thereby serves to turn shaft 44 and all parts mounted thereon including disk 50. Preferably shaft 44 and disk 50 are rotated in a continuous and uninterrupted manner and to this end motor 32 is designed to operate continuously while the machine is in operation.

Gear 198 also meshes with a gear 200 fixedly mounted upon a shaft 202 journaled in a pair of side plates 204 bolted as at 206 to lower frame members 38. Mounted upon shaft 202 are various timing cams which serve to effect operation of the various moving parts of the machine in proper timed relationship.

The opening or spreading movement of the spreader blades 72 and 74 is operatively controlled from cam shaft 202. More specifically, there is mounted on cam shaft 202 a hub 208 which is provided with a radial arm 210 (see Figure 16) having an arcuate slot therein which receives a bolt 212. Bolt 212 is threadedly received in a cam 214 which can be adjusted with respect to shaft 202 and hub 208 due to the slot in cam 214. Cam 214 has the cam surface thereof engaged by a cam roller 216 rotatably mounted upon an arm 218 keyed to a shaft 220. Formed integral with arm 218 is a second angularly disposed arm 222 which has attached thereto by a bolt and slot connection a support arm 224 which carries a cam surface 226. As may be best seen from Figures 1 and 11, cam surface 226 is adapted to be in rolling contact with a roller 228 mounted upon a stud 230 threadedly engaged in bracket 122. A similar cam 226 and roller 228 is provided for bracket 120, the second cam surfaces 226 being pivoted upon the same shaft 220 and being adapted to be moved in unison. Contact of the roller 228 with cam surface 226 spreads blades 72 and 74 by pivoting brackets 120 and 122 about pins 128 and 136 against the action of springs 140 and 142.

The major portions of the cam surfaces 226 are curved and so shaped that the spreader blades 72 and 74 once spread are maintained in the spread relationship and further later contact a cam surface 232 (see Figure 1) having a part-circular surface concentric with the center of shaft 44 and forming a continuation of the cam surfaces 226. The cam members 232 are mounted upon brackets 234 suitably fastened as by bolts 236 to the legs 34 (see Figure 2). By this construction the spreader blades 72 and 74 can be opened as the carrier or turret continues to revolve without interruption and the spreader blades are maintained in the opened position for substantial angular movement of the turret, preferably through an angle of approximately 120°. Upon leaving the right hand end of cam surfaces 232 as viewed in Figure 1, the spreader blades 72 and 74 are returned to the closed position under the action of springs 140 and 142. The spreader blades are now in position to receive another fruit.

Figure 13:
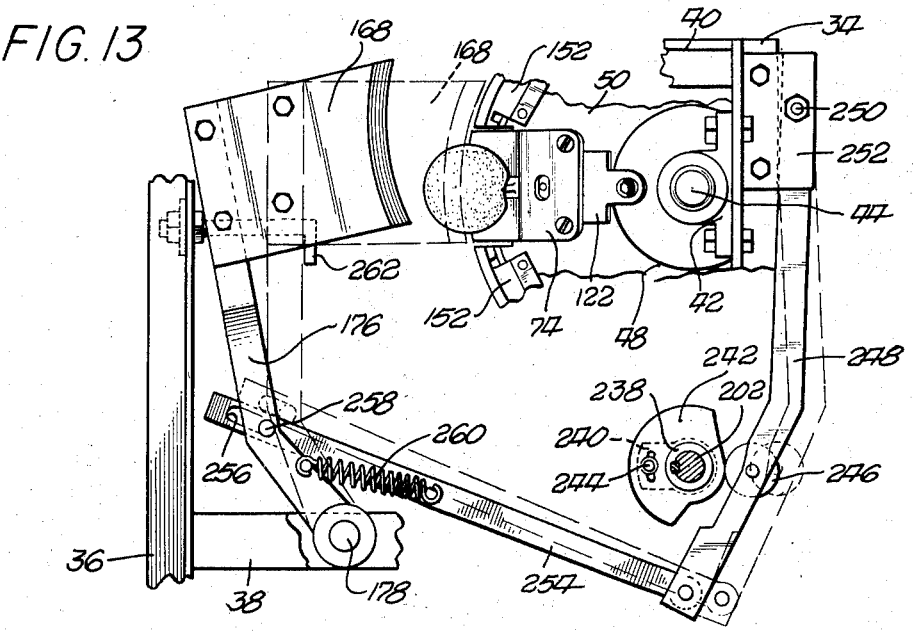
Figure 13 is a view on a reduced scale illustrating the operation of the second dividing or severing means of the present invention and the actuating mechanism thereof.

Also mounted upon cam shaft 202 is a second hub 238 which is keyed thereto (see Figure 13) and has formed thereon an integral arm 240. A cam 242 is mounted on hub 238 and is adjustably secured thereto and to shaft 202 by a screw 244 passing through a slot. Cam 242 engages a cam roller 246 pivotally mounted upon an arm 248 which is in turn pivotally mounted as at 250 on a plate 252 attached to the frame. The lower end of arm 248 is movable upon contact of the roller 246 with cam 242 as shown by the solid and dotted positions and thereby serves to move the second scoring or severing means in the form of blade 168. More specifically, the lower end of arm 248 has pivotally attached thereto a link 254 having at its other end an elongated slot 256 which receives a pin 258 fixedly attached to the yoke 176 which supports blade 168. The slot 256 and pin 258 form a lost motion mechanism and the parts are held in the position shown in solid lines by a spring 260 interconnecting link 254 and yoke 176. Cam 242 acting against roller 246 is operative to move knife 168 and the associated parts to the position shown in dotted lines. Blade 168 moves to the right as viewed in Figure 13 until it hits a pit or until it engages a stop 262 mounted on leg 36.

Figure 14:
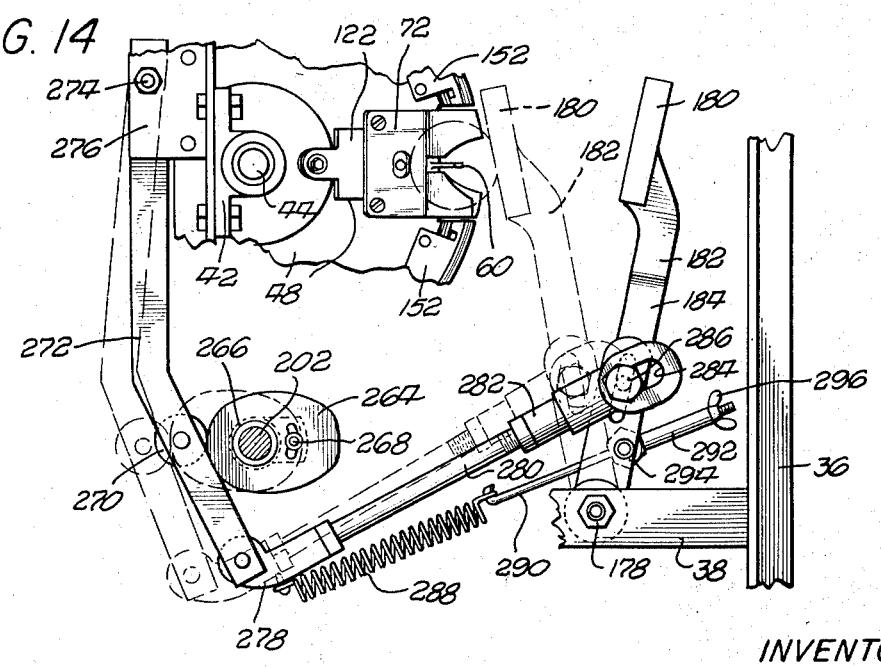
Figure 14 is a fragmentary view on a reduced scale illustrating the structure and driving mechanism for the fruit presser pad of the machine of the present invention.

The presser pads 180 (see Figure 14) are actuated by a cam 264 which is also mounted upon the cam shaft 202. Fixedly attached to cam shaft 202 is a hub 266 which mounts and supports the cam 264 by means of a bolt 268 passing through a slot to give adjustability of the cam 264 with respect to hub 266 and shaft 202. Cam 264 acts against a roller 270 mounted upon arm 272 pivoted at point 274 to a plate 276 attached to the mechanism frame. The action of cam 264 against roller 270 moves arm 272 and the associated parts from the solid line position to the dotted line position as seen in Figure 14 whereby to move presser pads 180. Interconnection is made between arm 272 and the presser pads 180 by means of a link 278 pivoted to the lower end of arm 272 and connected by a rod 280 adjustably and threadedly received thereby and adjustably and threadedly attached to a second link 282. Link 282 is provided with an elongated slot 284 which receives a pivot stud 286 adjustably threaded into one of the arms of yoke 184. A coil spring 288 has one end attached to link 278 and the other end to a rod 290 slidably received in a sleeve 292 pivotally attached to yoke 184 by means of a pivot stud 294. A wing nut 296 threadedly engages the end of rod 290 extending beyond sleeve 292 whereby to permit adjustment of the tension in spring 288. Spring 288 and its associated parts govern the lost motion connection provided by slot 284 and pivot pin 286 to hold the parts normally in the position shown in full lines in Figure 14. Rotation of cam 264 acting against roller 270 pivotally moves the various parts to the dotted line position thereby urging the presser pads 180 against the butt end of peaches positioned on the carrier 22. This action assures that the peaches on the carrier are held thereon under a sufficient but not excessive force while the spreader blades 72 and 74 are moving outwardly away from each other to separate the fruit flesh from the pit.

Means is provided for locking the presser pads 180 against reverse movement from the fruit pressing position shown in dotted lines in Figures 14 and 15 and in solid lines in Figure 1. The locking means has been provided because it is found that less ripe fruit tends to push the presser pads back if the spring 288 is not under relatively great tension. On the other hand, if spring 288 is provided with relatively great tension, the pads 180 tend to bruise the more ripe fruit. The less ripe or greener fruit in moving the presser pads reversely tend to escape the action of the spreader blades whereby to drop away from the carrier 22 without being properly pitted. The latching means to be described is automatically operable on forward movement of the presser pads (i. e., movement of the presser pads to the fruit engaging position) to lock the presser pads against retrograde movement, the locking mechanism being automatically released upon completion of the pitting and spreading operation thereby releasing the presser pads for retrograde or reverse movement.

The construction and operation of the locking mechanism can be best seen from Figures 1 and 15. A pair of ratchet bars 298 having staggered teeth are pivoted on a common stud bolt 300 which is carried by a bar 302 pivoted at the left hand end at point 304 on leg 36. Ratchet bars 298 cooperate with a pawl 306 mounted on one leg of yoke 184. A coil spring 308 under compression is mounted between a lug 310 on bar 302 and an arm 312 on ratchet bars 298. A set screw 314 adjustably engages arm 312 while spring 308 urges bars 298 to the latching position. Forward movement of yoke 184 automatically engages pawl 306 with rack bars 298 whereby to hold the presser pads 180 in the forward engaging position as shown by dotted lines in Figures 14 and 15. After the spreader blades 72 and 74 have been opened or spread, it is desired to release latch bars 298 from pawl 306 thereby permitting the presser pads 180 to return to the retracted or full line position. To this end the cam shaft 202 is provided with another collar 316 fixedly attached to cam shaft 202 and adjustably supports a cam 318 by means of a bolt 320 fastened through an adjusting slot. The surface of cam 318 receives and drives a cam roller 322 rotatably carried by the free end of bar 302. When the raised or higher portion of cam 318 engages roller 322, bar 302 is lifted to the dotted position thereby moving ratchet bars 298 out of engagement with pawl 306. This permits the presser pads 180 to be returned to the retracted position under the urging of spring 288.

The operation of the machine will now be described in detail through an entire cycle of operation. The electrical motor 32 is first energized whereby to drive carriage or turret 22 in a steady and uniform manner and in a counterclockwise direction as viewed in Figure 1 of the drawings. Whole fruit, such as freestone peaches which have been roughly graded as to size is supplied to an operator standing in front of the machine. The operator grasps a fruit and roughly orients the fruit so that the suture plane thereof lies in the plane of disk 50 on carrier 22 and the stem indent is directed toward the center of disk 50. The operator then moves the peach toward the carrier 22 impaling the fruit on the pair of severing and dividing blades 26 just above a guard member 324 mounted on the machine frame and encircling the forward exposed portion of the carrier 22 at a point slightly below shaft 44. The sharpened edge 82 on spreader blade 72 and the sharpened edge 106 on spreader blade 74 first cut the skin of the peach and upon further movement of the peach by the operator upon the spreader blades, the cutting surfaces 84 and 108 are brought into operation whereby to sever the skin of the fruit around substantially one-half of the circumference thereof and to cut the flesh of the fruit substantially one-half across the diameter thereof and around the pit. Preferably the stem end of the fruit has been oriented toward the carriage whereby the pit is received between cutting edges 84 and 108 with the pit engaging prongs 60 passing on opposite sides of the pit through the fruit flesh.

The above movement of a fruit onto the carriage is accomplished with a maximum safety to the operator due to the fact that the only sharpened portions on the carrier are the forward sharpened edges 82 and 106 on spreader blades 72 and 74, respectively. The edges of the spreader blades 72 and 74 are protected from the hand of the operator by guards 152 on the periphery of disk 50.

The initial impaling of the fruit upon the spreader blades begins the spreading of the fruit flesh from the pit due to the divergence of the spreader blades toward the center of the carriage as may be best seen in Figure 6 and Figure 10.

As the carriage continues to revolve with the fruit impaled on the spreader and divider blades and the associated pit retaining prongs, the fruit is carried in a counterclockwise direction as viewed in Figure 1. Another fruit is impaled by the operator on the next set of divider and spreader blades which appear above guard 324. Eventually the fruit first impaled upon the carriage has described a travel of approximately something less than 180° and arrives at a point at which the second severing blade 168 is moved to the right as viewed in Figure 1 under the operation of the drive mechanism described above operated from cam shaft 202. The sharpened edge 170 of blade 168 is moved toward the carriage and severs the remaining portion of the circumference of the skin of the fruit and further cleaves the flesh until the sharpened edge 170 touches the outwardly directed end of the pit or until the knife yoke comes in contact with the stop 262. When blade 168 is in this position, the sharpened edge thereof is in close proximity to the periphery of the carriage and the divider blades 72 and 74 and is substantially concentric to the axis of the carriage and the radius of curvature of the cutting edges of blades 72 and 74. If the pit is substantially larger than normal, it may be beyond the periphery of the cutting edges of the spreader blades 72 and 74 in which case blade 168 engages the end of the pit and the spring 260 yields thereby permitting blade 168 to stop while the actuating mechanism moves to the final position. The blade 168 is held in the position shown in Figure 1.

The presser pads 180 are then swung until they engage the outwardly extending end of the fruit flesh and are held in this position during the operation of the spreading of the outer ends of the spreader blades 72 and 74.

The driving mechanism for presser pads 180 is such as to accommodate varying sizes of peaches through the yieldability of spring 288 (see Figure 14). When the pads 180 have reached the forwardmost position as viewed in Figure 1, one of the ratchets 298 engages the pawl 306 attached to the support arm of the presser pads whereby to hold the presser pads 180 in the forwardmost position during the spreading of the blades 72 and 74.

After the locking of presser pads 180 in the forward position, the rollers 228 attached to the mount for spreader blades 72 and 74 engage the opening cams 226 whereby to move the outer ends of the spreader blades to the opened or spread position whereby to separate the flesh of the fruit from the pit. During the spreading of blades 72 and 74, the pit is retained by the prongs 60 against lateral movement thereby permitting ready separation of the flesh from the pit. The blades are held in the open position by cam 226 and by the further cam 232 during the discharge of the fruit halves and the pit from the machine. To facilitate discharge the spreader blades are held in the open position as is illustrated in the lower portion of Figure 2 of the drawings. Blades 72 and 74 are moved to the closed position shortly before they rise above guard 324 at the front end of the machine.

Immediately after the spreading of blades 72 and 74, arm 302 is lifted by cam 318 (see Figure 15) whereby to remove ratchet bars 298 from pawl 306 thereby permitting the presser pads 180 to be moved to the retracted position as is shown in full lines in Figure 15. The presser pads 180 and the blade 168 are now in position to receive and operate upon the fruit carried by the next pair of spreader blades.

It will be seen that there has been provided a machine which fulfills all the objects and advantages set forth above. Although a preferred embodiment of the invention has been set forth for purposes of illustration, it is to be understood that various changes and modifications can be made therein without departing from the spirit and scope of the invention. Accordingly, the invention is to be limited only as set forth in the following claims.

1. In a machine for processing fruit of the freestone type including a rotatable fruit conveyor disk having a blunt periphery, a pair of spreader blades, one spreader blade being pivotally mounted on one side of said conveyor disk and the other spreader blade being pivotally mounted on the other side of said conveyor disk and opposite and in alignment with said one spreader blade, said spreader blades having a first set of circumferentially extending cutting edges positioned radially outwardly beyond the periphery of said conveyor disk and spaced apart to receive a fruit pit therebetween, and a second set of cutting edges extending inwardly from said first set of cutting edges and adapted to cut the flesh of the fruit about the pit.

2. In a machine for processing friut of the freestone type including a rotatable fruit conveyor disk, a pair of spreader blades, one spreader blade being pivotally mounted on one side of said conveyor disk and the other spreader blade being pivotally mounted on the other side of said conveyor disk and in alignment with said one spreader blade, said one spreader blade having a first circumferentially extending cutting edge positioned radially outwardly beyond the periphery of said conveyor disk, said other spreader blade having a first circumferentially extending cutting edge positioned radially outwardly beyond the periphery of said conveyor disk and spaced circumferentially away from said first cutting edge of said one spreader blade to receive a fruit pit therebetween, and a second cutting edge formed on each of said spreader blades and extending inwardly from said first cutting edges and adapted to cut the flesh of the fruit about the pit.

3. In a machine for processing fruit of the freestone type including a rotatable fruit conveyor disk, a first spreader blade pivotally mounted on one side of said conveyor disk, a second spreader blade pivotally mounted on the other side of said conveyor disk and in alignment with said first spreader blade, each spreader blade having a first circumferentially extending cutting edge positioned radially outwardly beyond the periphery of said conveyor disk, said first cutting edges being spaced apart from each other circumferentially to reeceive a fruit pit therebetween, each spreader blade having a second circumferentially extending cutting edge positioned beyond the periphery of said conveyor disk and spaced inwardly from the first cutting edge of the other spreader blade and lying in contact therewith, a third set of cutting edges formed on said spreader blades and extending inwardly from said first cutting edges, and a fourth set of cutting edges formed on said spreader blades and extending inwardly from said second cutting edges and spaced circumferentially from the associated one of said third cutting edges and against the other spreader blade.

4. In a machine for processing fruit of the freestone type, the combination comprising a rotatable fruit conveyor disk, a plurality of pairs of spreader blades positioned around the circumference of said conveyor disk, one spreader blade of each set being pivotally mounted on one side of each conveyor disk and the other spreader blade of each set being pivotally mounted on the other side of each conveyor disk and opposite the associated one spreader blade, each set of spreader blades having a first set of circumferentially extending cutting edges positioned radially outwardly beyond the periphery of said conveyor disk and spaced apart to receive a fruit pit therebetween, a second set of cutting edges extending inwardly from said first set of cutting edges and adapted to cut the flesh of the fruit about the pit, and a guard member positioned between each adjacent set of spreader blades and mounted on said conveyor disk, each guard member including a guard portion lying substantially in the same plane as the adjacent first set of cutting edges and forming substantially a continuation thereof and being blunt to protect the hands of the operator from said first set of cutting edges.

5. In a machine for processing fruit of the freestone type, the combination comprising a rotatable fruit conveyor disk, means to rotate said disk, a pair of spreader blades, one spreader blade being pivotally mounted on one side of said conveyor disk and the other spreader blade being pivotally mounted on the other side of said conveyor disk and in alignment with said one spreader blade, said spreader blades having a first set of circumferentially extending cutting edges positioned radially outwardly beyond the periphery of said conveying disk and spaced apart to receive a fruit pit therebetween, a second set of cutting edges extending inwardly from said first set of cutting edges and adapted to cut the flesh of the fruit about the pit, a pit retainer mounted on said fruit conveyor and positioned between said first set of cutting edges to retain a fruit pit therebetween, and means to separate said spreader blades away from each other after engaging a fruit while the pit of the fruit is engaged by said pit retainer whereby to separate the fruit flesh from the pit.

6. In a machine for processing fruit of the freestone type, the combination comprising a rotatable fruit conveyor disk, means to rotate said disk, a pair of spreader blades, one spreader blade being pivotally mounted on one side of said conveyor disk and the other spreader blade being pivotally mounted on the other side of said conveyor disk and in alignment with said one spreader blade, said spreader blades having a first set of circumferentially extending cutting edges positioned radially outwardly beyond the periphery of said conveying disk and spaced apart to receive a fruit pit therebetween, a second set of cutting edges extending inwardly from said first set of cutting edges and adapted to cut the flesh of the fruit about the pit, an integral pit retainer mounted on said fruit conveyor between said first set of cutting edges, said pit retainer having a pair of pit retaining prongs formed integral therewith and extending outwardly therefrom and laterally with respect to said conveyor disk, said prongs and outer ends extending radially outwardly with respect to said conveyor disk to grip a pit therebetween, and means to separate said spreader blades away from each other when engaging a fruit while the pit of the fruit is engaged by said prongs whereby to separate the fruit flesh from the pit.

7. In a machine for processing fruit of the freestone type, the combination comprising a rotatable fruit conveyor disk, means to rotate said disk, a pair of spreader blades, one spreader blade being pivotally mounted on one side of said conveyor disk and the other spreader blade being pivotally mounted on the other side of said conveyor disk and in alignment with said one spreader blade, said spreader blades having a first set of circumferentially extending cutting edges positioned radially outwardly beyond the periphery of said conveying disk and spaced apart to receive a fruit pit therebetween, a second set of cutting edges extending inwardly from said first set of cutting edges and adapted to cut the flesh of the fruit about the pit, a first guard member mounted on said conveyor disk adjacent said spreader blades and a second guard member mounted on said conveyor disk on the other side of said spreader blades, each guard member including a blunt portion extending radially outwardly of the disk and in circumferential alignment with said first set of cutting edges.

8. In a machine for processing fruit of the freestone type, the combination comprising a rotatable fruit conveyor disk, means to rotate said disk, a pair of spreader blades, one spreader blade being pivotally mounted on one side of said conveyor disk and the other spreader blade being pivotally mounted on the other side of said conveyor disk and in alignment with one spreader blade, said one spreader blade having a first circumferentially extending cutting edge positioned radially outwardly beyond the periphery of said conveyor disk, said other spreader blade having a first circumferentially extending cutting edge positioned radially outwardly beyond the periphery of said conveyor disk and spaced circumferentially away from said first cutting edge of said one spreader blade to receive a fruit pit therebetween, a second cutting edge formed on each of said spreader blades and extending inwardly from said first cutting edges and adapted to cut the flesh of the fruit about the pit, a first guard member mounted on said conveyor disk adjacent said spreader blades and a second guard member mounted on said conveyor disk on the other side of said spreader blades, each guard member including a blunt portion extending radially outwardly of the disk and in circumferential alignment with said first set of cutting edges.

9. In a machine for processing fruit of the freestone type, the combination comprising a rotatable fruit conveyor disk, a plurality of pairs of spreader blades positioned around the circumference of said conveyor disk, one spreader blade of each set being pivotally mounted on one side of each conveyor disk and the other spreader blade of each set being pivotally mounted on the other side of each conveyor disk and opposite the associated one spreader blade, each set of spreader blades having a first set of circumferentially extending cutting edges positioned radially outwardly beyond the periphery of said conveyor disk and spaced apart to receive a fruit pit therebetween, a second set of cutting edges extending inwardly from said first set of cutting edges and adapted to cut the flesh of the fruit about the pit, a guard member positioned between each adjacent set of spreader blades and mounted on said conveyor disk, each guard member including a guard portion lying substantially in the same plane as the adjacent first set of cutting edges and forming substantially a continuation thereof and being blunt to protect the hands of the operator from said first sets of cutting edges, a pit retainer mounted on said fruit conveyor for each of said pairs of spreader blades and positioned between said first set of cutting edges of each pair of spreader blades to retain a fruit pit therebetween, and means to separate said spreader blade away from each other after engaging a fruit while the pit of the fruit is engaged by a pit retainer whereby to separate the fruit flesh from the pit.

10. In a machine for processing fruit of the freestone type, a rotatable fruit conveyor disk, a pair of spreader blades, one spreader blade being pivotally mounted on one side of said conveyor disk and the other spreader blade being pivotally mounted on the other side of said conveyor disk and opposite one spreader blade, said spreader blades having a first set of circumferentially extending cutting edges positioned radially outwardly beyond the periphery of said conveyor disk and spaced apart to receive a fruit pit therebetween, a second set of cutting edges extending inwardly from said first set of cutting edges and adapted to cut the flesh of the fruit about the pit, means operatively connected to said conveyor disk for continuously rotating the same, a flesh severing blade in substantially the same plane as that of said first cutting edges, means for periodically reciprocating said flesh severing blade toward and from the conveyor successively to engage and complete the severance of the flesh of a fruit impaled on the spreader blades, and means for moving said spreader blades apart in timed relation with the reciprocation of said flesh severing blade to effect separation of the severed sections of the fruit after the severance of the fruit has been completed by the severing blade.

11. In a machine for pitting fruit of the freestone type, the combination comprising a fruit conveyor disk, a pair of spreader blades, one spreader blade being pivotally mounted on one side of said conveyor disk and the other spreader blade being pivotally mounted on the other side of said conveyor disk and in alignment with said one spreader blade, said one spreader blade having a first circumferentially extending cutting edge positioned radially outwardly from the periphery of said conveyor disk, said other spreader blade having a first circumferentially extending cutting edge positioned radially outwardly beyond the periphery of said conveyor disk and spaced circumferentially away from said first cutting edge of said one spreader blade partially to sever the flesh of a fruit impaled thereon and to receive a fruit pit therebetween, a second cutting edge formed on each of said spreader blades and extending inwardly from said first cutting edges and adapted to cut the flesh of the fruit about the pit, means operatively connected to said conveyor disk for continuously moving the same at a uniform rate, a flesh severing blade mounted in spaced relation with said conveyor and in substantially the plane of said first cutting edges, means for moving said flesh severing blade toward and from the continuously moving conveyor disk to engage and complete the severance of a fruit impaled on said spreader blades, means mounting said spreader blades on said conveyor for relative movement from an aligned position of said first cutting edges when entering the fruit as it is impaled thereon to a spaced apart position separating the severed flesh sections of the fruit, means mounted to move toward and from the continuously moving fruit on said conveyor disk for engaging and pressing the fruit inwardly along said spreader blades, and means for actuating said flesh severing blades and spreader blades and pressing means in timed relation to complete first the severance of the flesh of the fruit and then to press the severed flesh of the fruit inwardly along the spreader blades as the spreader blades are moved about to separate said sections of the fruit.

12. In a machine for pitting fruit of the freestone type, the combination comprising a rotatable fruit conveyor disk, a first spreader blade pivotally mounted on one side of said conveyor disk, a second spreader blade pivotally mounted on the other side of said conveyor disk and in alignment with said first spreader blade, each spreader blade having a first circumferentially extending cutting edge positioned radially outwardly beyond the periphery of said conveyor disk, said first cutting edges partially severing the flesh of a fruit impaled thereon and being spaced apart from each other circumferentially to receive a fruit pit therebetween, each spreader blade having a second circumferentially extending cutting edge positioned beyond the periphery of said conveyor disk and spaced inwardly from the first cutting edge of the other spreader blade and lying in contact therewith, a third set of cutting edges formed on said spreader blades and extending inwardly from said first cutting edges to sever the flesh about the pit, a fourth set of cutting edges formed on said spreader blades and extending inwardly from said second cutting edges and spaced circumferentially from the associated one of said third cutting edges and against the other spreader blade, means operatively connected to said conveyor disk for continuously moving the same at a uniform rate, a flesh severing blade mounted in spaced relation with said conveyor and in substantially the plane of said first cutting edges, means for moving said flesh severing blade toward and from the continuously moving conveyor disk to engage and complete the severance of a fruit impaled on said spreader blades, means mounting said spreader blades on said conveyor disk for relative movement of said first cutting edges and said second cutting edges from an abutting and aligned position when entering the fruit as it is impaled thereon to a spaced apart position separating the severed flesh sections of the fruit, means mounted to move toward and from the continuously moving fruit on the conveyor for engaging and pressing the fruit inwardly along the spreader blades, and means for actuating said flesh severing blade and said spreader blades and said pressing means in timed relation to complete first the severance of the flesh of the fruit and then to press the severed flesh of the fruit inwardly along said spreader blades as the spreader blades are moved about to separate said sections of the fruit.

13. In a machine for processing fruit of the freestone type, the combination comprising a continuously moving fruit conveyor, a pair of spreader blades pivotally mounted on said conveyor in alignment with each other, said spreader blades having a first set of frontal cutting edges positioned outwardly from said conveyor and spaced apart to receive a fruit pit therebetween, a second set of cutting edges extending inwardly from said first set of cutting edges and adapted to cut the flesh of the fruit about the pit, and a first guard member mounted on and movable with said conveyor adjacent said spreader blades on one side thereof and a second guard member mounted on and movable with said conveyor on the other side of and adjacent said spreader blades, each guard member including a blunt portion extending outwardly and in alignment with said first set of cutting edges whereby to protect the fingers of a user from said first cutting edges.

References Cited in the file of this patent

UNITED STATES PATENTS

| 1,334,449 | Griffin | Mar. 23, 1920 |
| 1,505,488 | Pienmattei | Aug. 19, 1924 |
| 2,588,575 | Rollins | Mar. 11, 1952 |
| 2,652,085 | Ansley | Sept. 15, 1953 |
| 2,704,561 | Thompson | Mar. 22, 1955 |